UNITED STATES PATENT OFFICE.

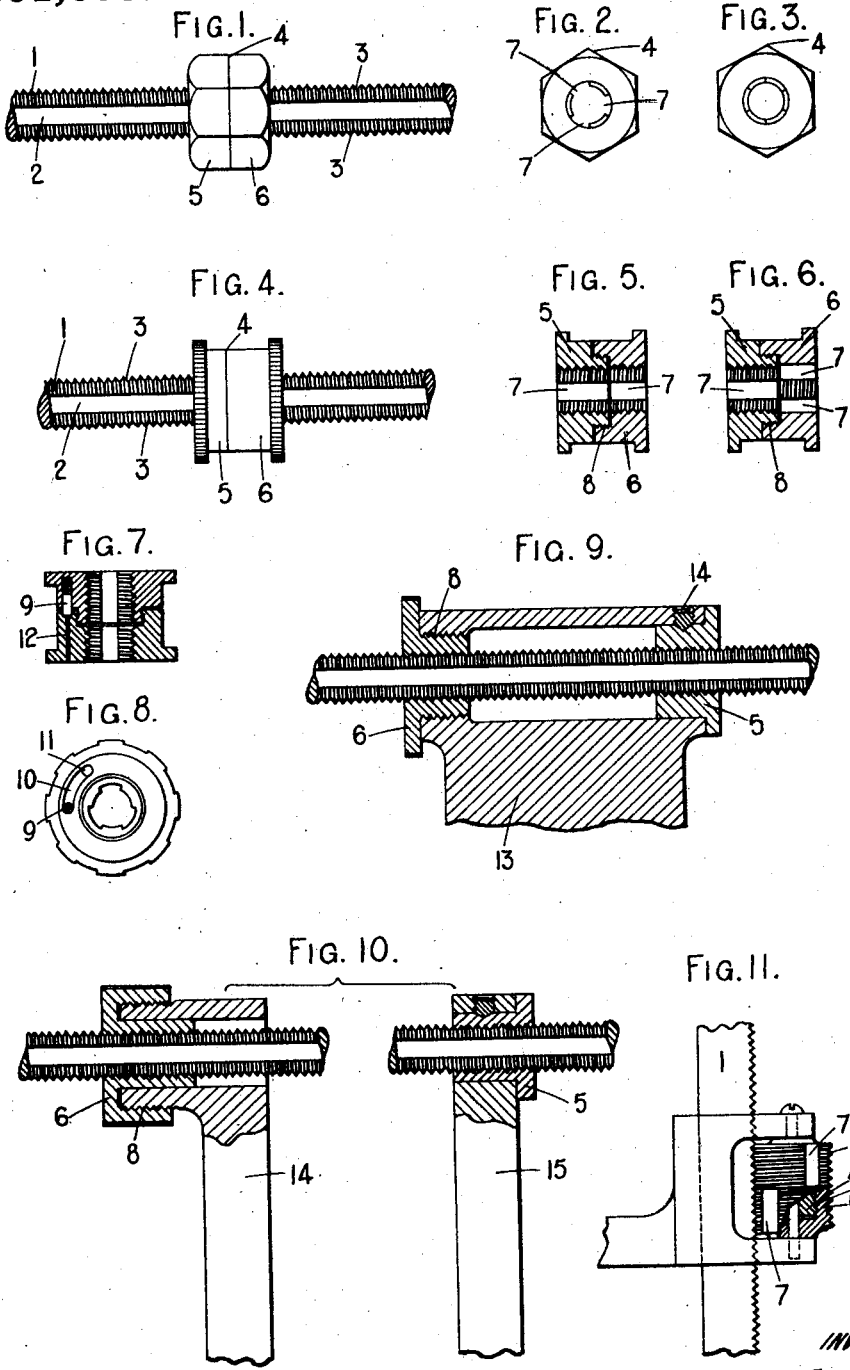

GEORGE HAZELTON, OF PORTADOWN, IRELAND.

SCREWED MECHANISM.

1,391,633.  Specification of Letters Patent.  Patented Sept. 20, 1921.

Application filed December 15, 1920. Serial No. 431,016.

*To all whom it may concern:*

Be it known that I, GEORGE HAZELTON, a British citizen, residing at Portadown, county Armagh, Ireland, have invented certain new and useful Improvements in Screwed Mechanisms, of which the following is a specification.

This invention relates generally to devices comprising two members having screwed engagement, and has for its object to provide means whereby the said screwed engagement may be temporarily suspended and an axial sliding adjustment of the two parts may be rapidly effected, the screwed engagement being thereafter reëffected.

The two engaging members generally comprise a male and a female member, but the invention is not confined to this class of device.

In all cases, however, one of said engaging members comprises two elements which are rotatable relatively to each other about the common axis. The said elements may be in contact with each other and may be maintained in proper relation by one element being mounted on a part of the other element. Or alternatively, the two elements may be mounted in a common part of the same mechanism or device, or in different parts of the same mechanism or device, or in different mechanisms or devices.

The invention is illustrated in the accompanying drawings in which Figures 1, 2 and 3 illustrate one constructional form of the invention and Figs. 4, 5 and 6 a modified constructional form, both of the male and female type wherein the two elements of the second members are mounted together. Figs. 7 and 8 illustrate a detail. Fig. 9 illustrates a modification wherein the two elements are separately mounted in the same mechanism or device, and Fig. 10 where they are mounted in separate devices. Fig. 11 shows a further modification wherein the engaging members are not of the male and female type.

Referring now to Figs. 1 to 6 of the drawing, the first or male member 1 comprises a screwed bar, rod, shaft or the like having its external thread interrupted by one or more grooves or recesses 2 so as to leave one or more ribs 3 on the outer periphery of which the thread is formed. The second or female member 4 comprises two elements 5, 6 each of which is threaded so as to be capable of operative engagement with the thread of the member 1, the thread of the elements 5, 6 being also interrupted by one or more grooves 7 corresponding to the ribs 3 of the member 1. In the form shown, the elements 5, 6 have screwed engagement with each other by means of a thread 8 having the same pitch as the thread of the member 1, and are capable of relative rotation about the common axis. The external shape of the member 4 may take the form of an ordinary hexagonal nut as shown in Figs. 1 to 3, or of a milled cylindrical head as shown in Figs. 4 to 6; or it may have any other suitable form.

It will be seen that when the elements 5, 6 of the member 4 occupy the relative position illustrated in Figs. 2 and 5, wherein the grooves 7 are axially in register, the said member can, after rotation on the member 1 if necessary, be slid endwise along the said member 1 owing to the said grooves 7 being in register with the ribs 3 on the member 1; and that when the elements 5, 6 occupy the position illustrated in Figs. 3 and 6, the member 1 cannot be so slidden but functions as a complete nut having a continuous thread. For this latter purpose, the elements 5, 6 are so arranged that when they occupy the relative position illustrated in Figs. 3 and 6 the internal thread on both parts is capable of operative engagement at the same time with the thread of the member 1.

As the operative connection between the two elements 5, 6 is by means of a thread having the same pitch as that of the member 1, relative rotation of the two elements, is in the above circumstances, easily possible when the member 4 is mounted on the member 1. Preferably the said relative rotation is limited in angular distance to the angle subtended by a rib and a recess in the female thread of the member 4. This may be accomplished by the provision of a small axially-sliding spring-controlled bolt 9, Figs. 7 and 8, in the one part engaging in a shallow slot 10 in the other part. The slot 10 may have a small recess 11 at each end into which the bolt fits in the extreme positions, the surfaces of the recesses, however, being so shaped that on suitably rotating the said parts the bolt is easily forced out of the said recesses which exercise, however, a certain resistance to movement out of the extreme positions. In Fig. 7 is shown a small hole 12 in which a pin or other tool can be inserted to depress the bolt 9 at each rotation of the elements in fitting them together during assembling or for disassembling.

Fig. 9 shows a modification in which the elements 5, 6 of the female member are separatively mounted in a device 13. The element 5 is fixed by means of a cross-pin 14, but the element 6 is rotatably mounted by means of a screw thread 8 of the same pitch as that of the screw of the member 1. It will be seen that the relative movement of the elements 5, 6 is constrained in a manner exactly similar to that of the modifications described above.

Fig. 10 shows a further modification in which the elements 5, 6 are mounted in two separate devices 14, 15 which are fixed relatively to each other. The element 5 is fixed relatively to the device 15 and the element 6 is mounted in the device 14 by means of a screw thread 8 of similar pitch to that of the member. If the members 14, 15 are fixed, the shaft 1 can receive a quick and then a screwed axial adjustment relatively to the two members; contrariwise the elements 14, 15 may receive a quick and then a screwed adjustment relatively to the shaft if the latter is fixed.

Fig. 11 illustrates a further modification wherein the members 1 and 4 are not of the male and female type. In this case the thread on the elements 5, 6 of the member 4 is external and each element has an external groove 7 which may be placed in axial register with the rib of the member 1 for a sliding adjustment or out of axial register relating to each other for a screwed adjustment of the member 4.

The members 5, 6 are illustrated as united by a screw thread 8 having the same pitch as that of the thread of the member 1, but it will be realized that a continuous thread is not necessary to this modification nor to any of the preceding modifications, provided that the limited relative rotary movement of the members 5, 6 is constrained to produce an axial relative movement proportioned to the said rotary movement similarly to the axial and rotary movement of the member 4 relatively to the member 1.

This could, if necessary, be effected by equivalent devices such as a pin any one element and cam-shaped slot on the other element or by two engaging cam surfaces or the like.

Further it is to be understood that the identity of the relative movement of the two elements of the second member need not be mathematically exact with that of the relative movement of the two members. For instance, any exactitude may be compensated by the amount of clearance between the teeth, if desired, according to the nature of the purpose to which the device is put.

What I claim is:—

1. Screwed mechanism in which the thread of the first engaging member is interrupted by an axial groove so that the thread is formed on the periphery of a rib, and the second engaging member is formed of two elements both having the engaging thread interrupted by an axial groove corresponding to the rib of the first engaging member, the said elements being capable of rotating relatively to each other along a spiral path of equivalent pitch to the threads of the engaging members so that in one setting the second member can be slidden axially along the first member and in another setting the second member will screw along the first member substantially as described.

2. Screwed mechanism in which the thread of the first engaging member is interrupted by a plurality of axial grooves so that the thread is formed on the periphery of a plurality of ribs, and the second engaging member is formed of two elements both having the engaging thread interrupted by a plurality of grooves corresponding to the ribs of the first engaging members, the said elements being capable of rotating relatively to each other along the spiral path of equivalent pitch to the threads of the engaging members so that in one setting the second member can be slidden axially along the first member and in another setting the second member will screw along the first member substantially as described.

3. Screwed mechanism in which the first engaging member has an interrupted thread formed upon the face of a rib and the second engaging member is formed of two elements both having the engaging thread interrupted by an axial groove corresponding to the rib of the first engaging member, and the said elements being capable of rotating relatively to each other along a spiral path of equivalent pitch to the threads of the engaging members so that in one setting the second member can be slidden axially along the first member and in another setting the second member will screw along the first member substantially as described.

4. Screwed mechanism involving coöperating threaded members wherein the thread of the one member is interrupted and the other member comprises a pair of elements in both of which the engaging thread is interrupted by a plurality of axial grooves corresponding to the interrupted thread of the first mentioned member, the said elements being movably united together by means of a screw thread of the same pitch as that of the first mentioned member substantially as and for the purpose specified.

In testimony whereof I affix my signature.

GEORGE HAZELTON.